(12) United States Patent
Jaramillo-Velasques et al.

(10) Patent No.: US 10,393,621 B2
(45) Date of Patent: Aug. 27, 2019

(54) METHOD FOR ASSESSING THE CONDITION OF ROTATING MACHINERY CONNECTED TO AN ELECTRIC MOTOR

(71) Applicant: ABB SCHWEIZ AG, Baden (CH)

(72) Inventors: Victor-Hugo Jaramillo-Velasques, Medellin (CO); James Ottewill, Middlesex (GB)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/439,726

(22) Filed: Feb. 22, 2017

(65) Prior Publication Data

US 2017/0268960 A1    Sep. 21, 2017

Related U.S. Application Data

(63) Continuation of application No. PCT/EP2015/001659, filed on Aug. 7, 2015.

(30) Foreign Application Priority Data

Aug. 22, 2014 (EP) .................................. 14460051

(51) Int. Cl.
*G01M 13/02* (2019.01)
*G05B 23/02* (2006.01)
*G06N 3/08* (2006.01)

(52) U.S. Cl.
CPC ........... *G01M 13/02* (2013.01); *G05B 23/024* (2013.01); *G06N 3/08* (2013.01)

(58) Field of Classification Search
CPC ...... G01M 13/02; G01M 13/028; G06N 3/08; G06N 7/005; G06N 5/048; G05B 23/024;
(Continued)

(56) References Cited

U.S. PATENT DOCUMENTS 6,125,314 A * 9/2000 Graf ........................ B60T 8/175
701/53

6,188,945 B1 * 2/2001 Graf ........................ B60T 8/175
180/65.27
(Continued)

FOREIGN PATENT DOCUMENTS

DE      102008055593    7/2009
EP      1398119         7/2010

OTHER PUBLICATIONS

International Search Report for PCT International Application Serial No. PCT/EP2015/001659, completed Nov. 5, 2015, (3 pages).
Written Opinion of the International Searching Authority for PCT International Application Serial No. PCT/EP2015/001659, completed Nov. 5, 2015, (6 pages).

*Primary Examiner* — Shahed Ahmed
(74) *Attorney, Agent, or Firm* — J. Bruce Schelkopf; Taft Stettinius & Hollister LLP

(57) ABSTRACT

The subject of the invention is a method and a computer program for assessing the condition of rotating machinery connected to an electric motor, where the motor (MM) and the rotating machine (RM) comprise a drive train electrically powered from a three phase motor and said motor is connected with a computing device. The invention is characterized in that is comprises the step of classifying the condition of rotating machine (RM) connected to the electric motor (MM) of a drive train with unknown condition, by analyzing all the extracted representative features obtained from the electric signals acquired from the electric motor (MM) of said drive train, by using a trained neural network whose twining was conducted by analyzing the extracted features from N different drive trains of N conditions, where said trained neural network data is stored in unit (3.5) of the computing device (CD, CD') and next generating an output vector ($Z=[Z_1, \ldots Z_N]$), wherein the vector (Z) has N elements and if the output vector (Z) has only one element having value equal to 1 and the rest of elements values are equal to 0, determining the index (i) of the element with the value equal to 1, which index (i) indicates that the condition
(Continued)

Figure 1:
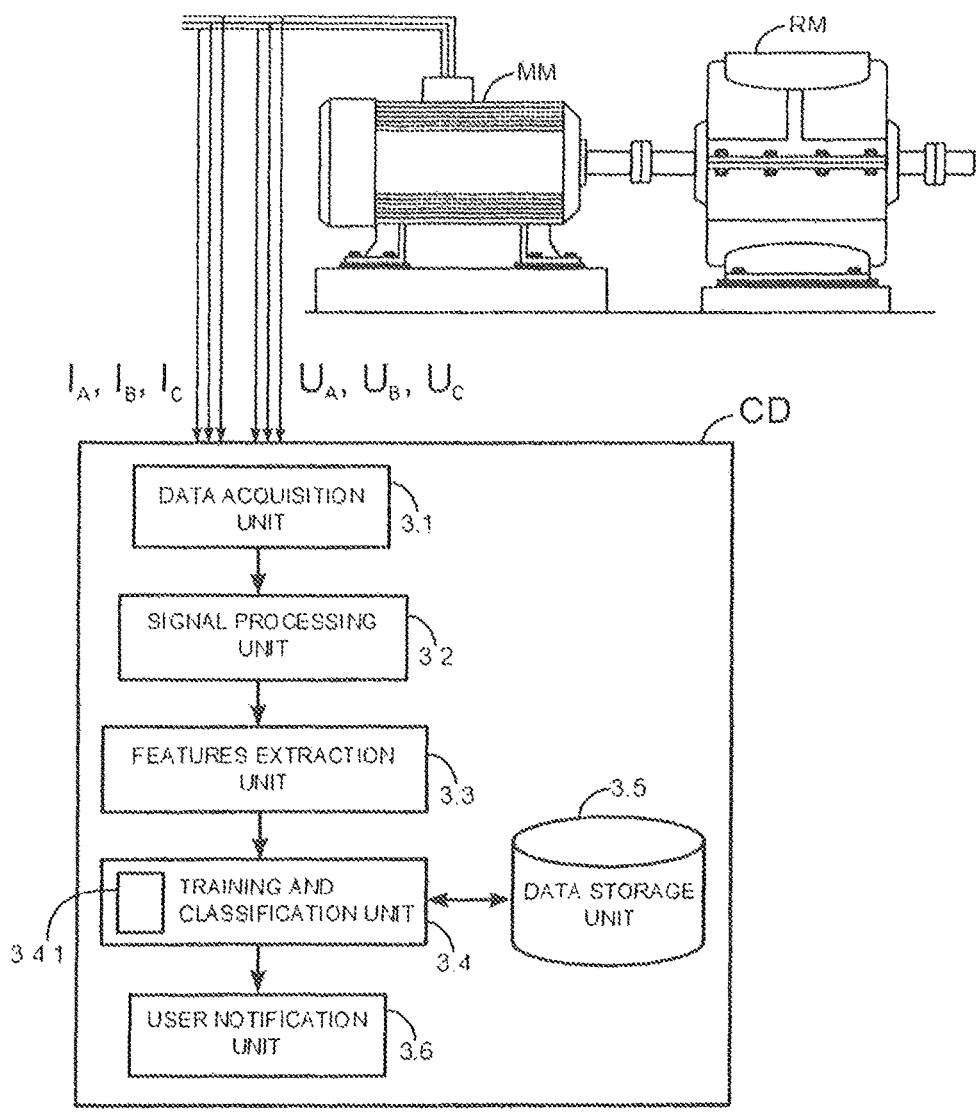

of she drive train under analysis is equal to the $i^{th}$ Condition of the N available known drive train conditions.

13 Claims, 6 Drawing Sheets

(58) Field of Classification Search
CPC ... G01H 1/003; F16H 57/01; F16H 2057/012; G07C 5/00
USPC .............. 702/34, 56, 65, 179, 181, 183, 184
See application file for complete search history.

(56) References Cited

U.S. PATENT DOCUMENTS

| | | | |
|---|---|---|---|
| 8,478,548 B2* | 7/2013 | Hudson | G01H 1/003 702/36 |
| 2005/0046375 A1* | 3/2005 | Maslov | B60L 8/00 318/650 |
| 2007/0282548 A1* | 12/2007 | Ling | G01M 13/025 702/65 |
| 2012/0143399 A1* | 6/2012 | Noumura | B60W 30/02 701/1 |
| 2013/0193891 A1* | 8/2013 | Wood | H02P 7/06 318/434 |

* cited by examiner

METHOD FOR ASSESSING THE CONDITION OF ROTATING MACHINERY CONNECTED TO AN ELECTRIC MOTOR

The subject of the invention is a method and a computer program for assessing the condition of rotating machinery connected to an electric motor, where the motor and the rotating machinery comprise a drive train electrically powered from a three phase motor and said motor is connected with a computing device.

The work leading to this invention has received funding from the European Union Seventh Framework Programme (FP7/2007-2013) under grant agreement n° PITN-GA-2010-264940.

BACKGROUND

Today, there is an increasing realization in industry that asset monitoring is key to promoting efficiency of resources. There are mounting calls for more advanced asset management methods. Furthermore, customers are beginning to select individual components on the basis of whether their condition may be monitored. For example, gearboxes often form an important part of rotating machinery drive trains, finding applications in industries such as oil and gas (in the drive trains of compressors or pumps), mining (in driving conveyors) or marine (in propulsion drive trains), amongst others, Any downtime of gearboxes can result in large losses to a customer. Standard methods of monitoring the condition of rotating machinery include vibration analysis using casing-mounted accelerometers and oil debris analysis. In the case of oil debris analysis, the recent trend is to use an online/inline oil debris sensor. This sensor is connected to the lubrication oil loop of the gearbox in order to capture the wear particles that come from the gears. On the other hand there is an emerging trend in scientific literature related to the analysis of electrical signals fin particular stator currents) in order to evaluate the health of rotating machinery connected to an electric motor.

STATEMENT OF PROBLEM

Due to spatial restrictions or environmental concerns, it is not always possible to instrument a shaft line component with oil debris or vibration sensors. Furthermore, sensors mounted to the components of a drive train may be considered as 'invasive' in that they are mounted directly on the rotating machinery of the system. It follows that in order to apply condition monitoring approaches based on these sensors the operation of the machine will have to be stopped in order to install the sensors. In such a situation, a non-invasive method of identifying the health of a component would be preferable. Whilst casing mounted sensors such as accelerometers may be considered as non-invasive, they are subject such as transmission path effects. Standard sensors such as accelerometers are typically casing-mounted. Usually, the relevant dynamics of the system occur on the rotating elements of the equipment, from which fault signatures propagate through the structure to the casing-mounted sensor. The propagation path, which will typically differ from installation to installation, can act to modulate and filter some of the dynamics useful for diagnostics. Hence, it can be difficult to properly set alarm threshold levels for a system using standard methods. Analysis of electrical signals potentially offers a solution which is less influenced by such uncertainties, as the electrical signals form a constituent part of the system. As previously noted, there is an emerging trend relating to analyzing electrical signals, in particular stator currents, to evaluate the health of rotating machinery connected to an electric motor. However, electric, motors are complex systems, especially when considering the interactions of rotor and stator fluxes, and the links between flux linkage and slip, and as yet it is not fully understood exactly how torsional oscillations related to faults in a drive line component, are translated through to the stator current. This issue is further complicated in the case that the electrical machine is supplied by a drive since the control action of the inverter can act to distort the voltage supplied to the electric motor. Hence, whilst it has been proven that fault signatures of drive train components can appear in electrical signals, it can still prove difficult to set alarm thresholds for these new techniques. Neural networks can potentially avoid these problems; if a sufficiently large number of distinct training cases are provided, the trained network will contain an 'understanding' of the interactions between the electrical machine and other components in the drive train, and hence will be able to assess the health of the system. US patent description US20070282548 A1 describes a method in which electric signals (currents and voltages) from an electric motor are used to calculate the impedance, and then this impedance is processed with the use of Neural Networks to search for patterns that could indicate known faults of the drive mechanical system, in this approach features extracted from real and complex waveforms of the impedance are used to train the neural network. In the same way European Patent EP1398119B1 describes a method to detect rotor jamming in an electric driller, by applying pattern recognition of the electrical signals by means of Neural Networks. On the other hand Beggar et. al, shows in "A General Regression Neural Network Model for Gearbox Fault Detection using Motor Operating Parameters", an application of the Neural Networks to build a data driven model through regression (instead of being used for classification) for the fault detection of gearboxes. These approaches use the Neural Networks in different ways (classification and regression), however, in addition to a proper Neural Network training another important aspect for the successful application of Neural Networks for classification purposes relies on the information that is provided to the Neural Network during the training process. The use of representative features in combination of a proper training of the neural network guarantees the reliability of the Neural Network classification capabilities. A solution with applications to classification is given in the present invention.

SUMMARY OF THE INVENTION

The present invention provides a method for assessing the condition of rotating machinery connected to an electric motor according to claims 1-4 and a computer program for assessing the condition of rotating machinery connected to an electric motor according to claims 5-8. The present invention provides also a drive train comprising an electrical motor connected with a rotating component wherein the motor is connected with a computing device, said computing device comprising means for performing the steps of claims 1-4.

The main advantage of the invention disclosed is that, by using neural networks to analyze the motor currents and voltages, the utilization of the technique requires only the acquisition of electrical signals, without the need of electromechanical sensors such as accelerometers, therefore providing a minimally invasive approach with high reliability.

DETAILED DESCRIPTION

Figure 2:
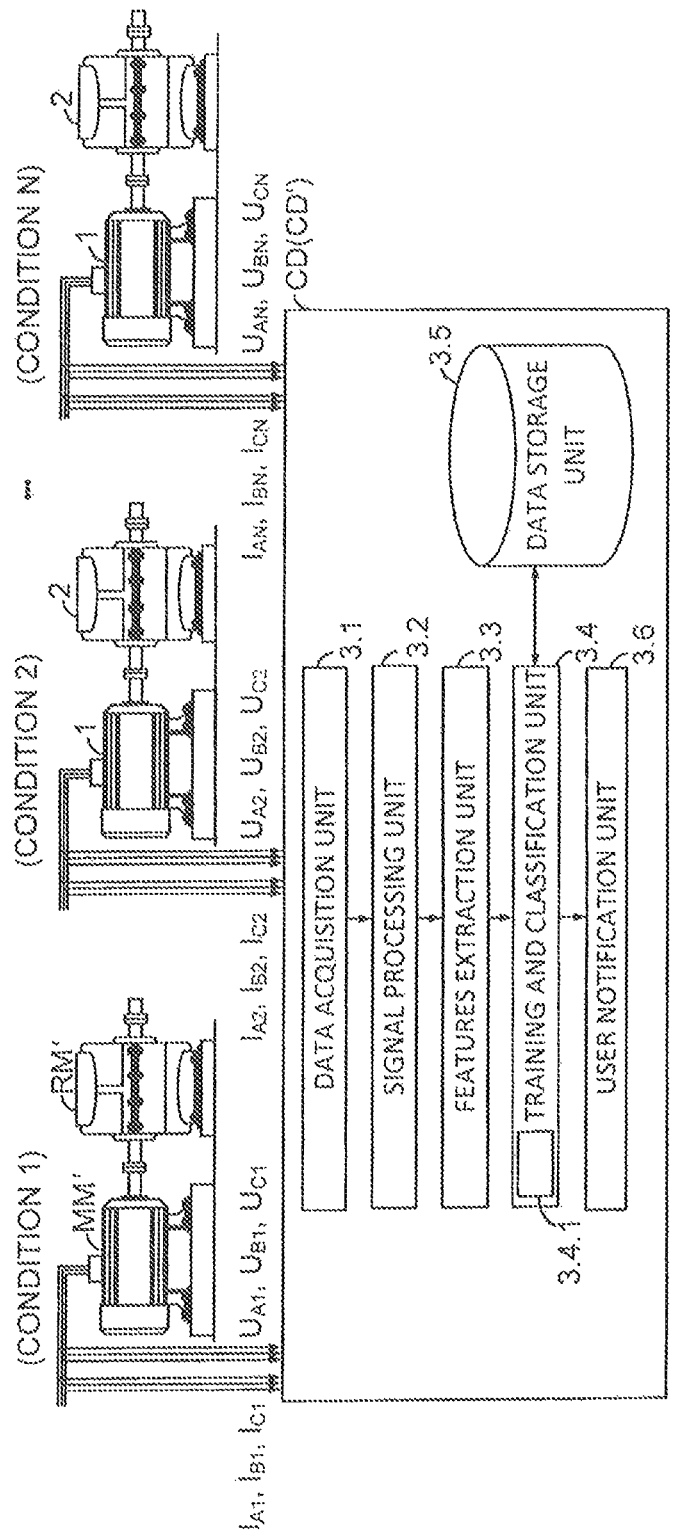
Figure 3:
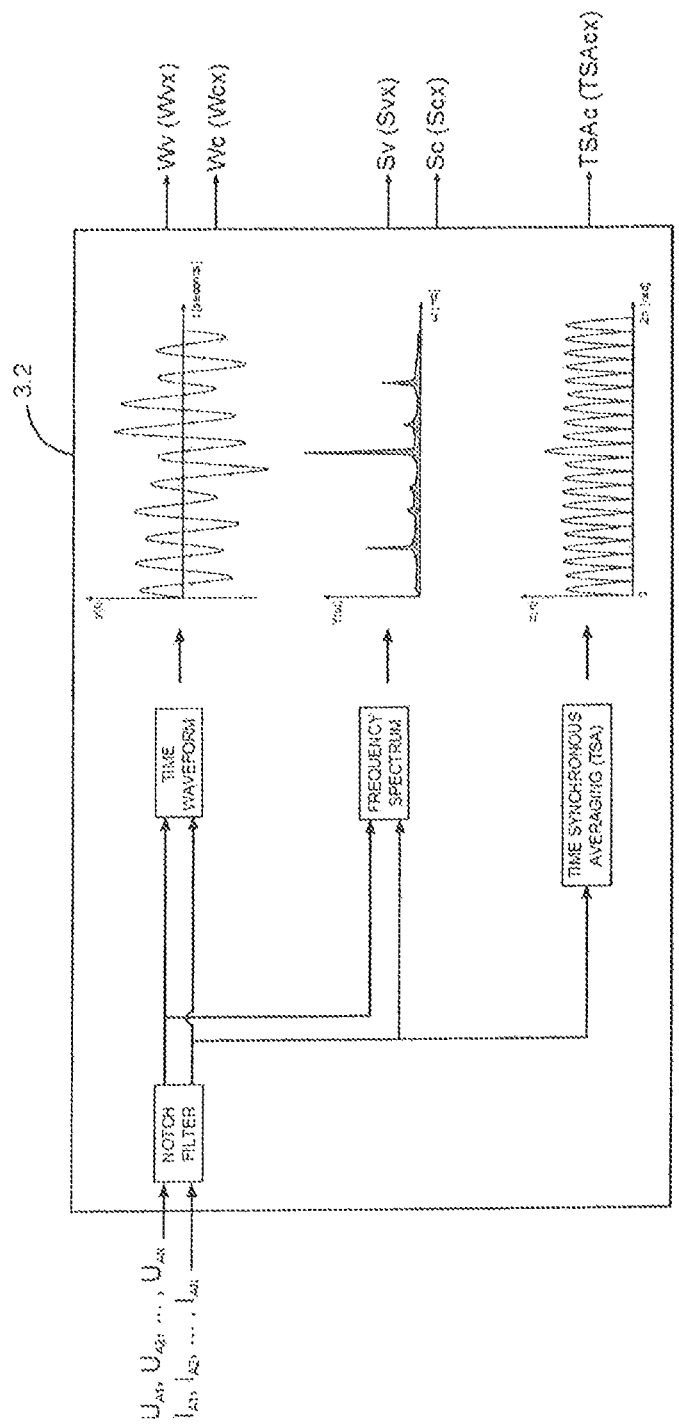
Figure 4:
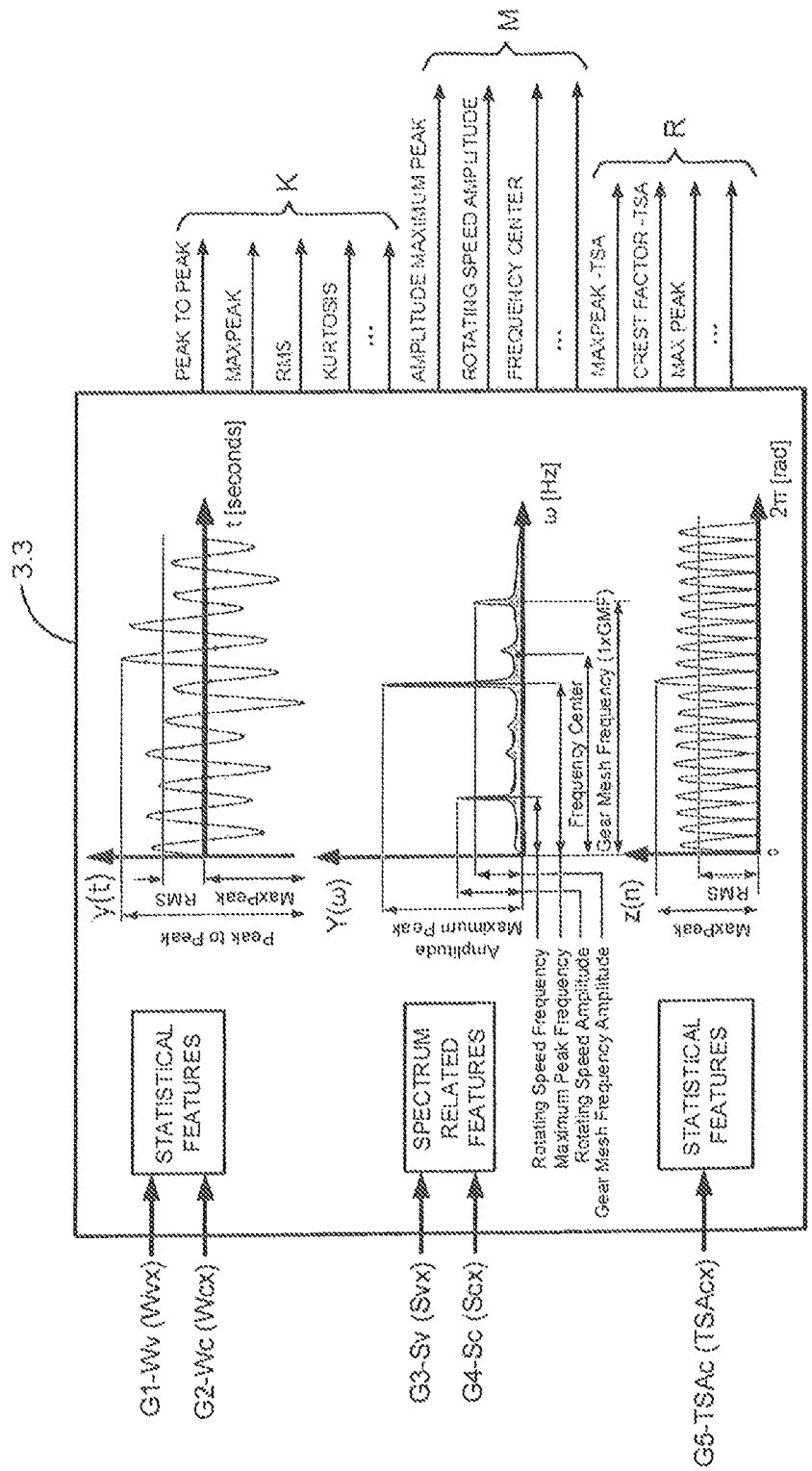
Figure 5:
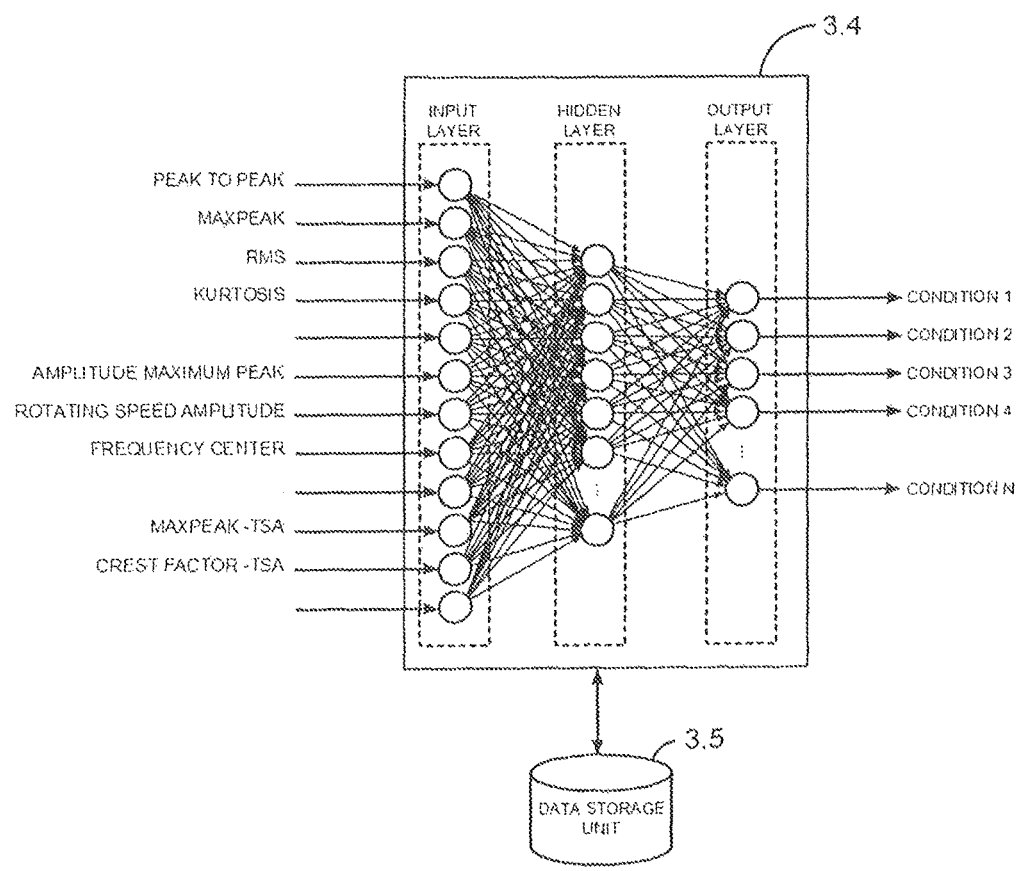
Figure 6:
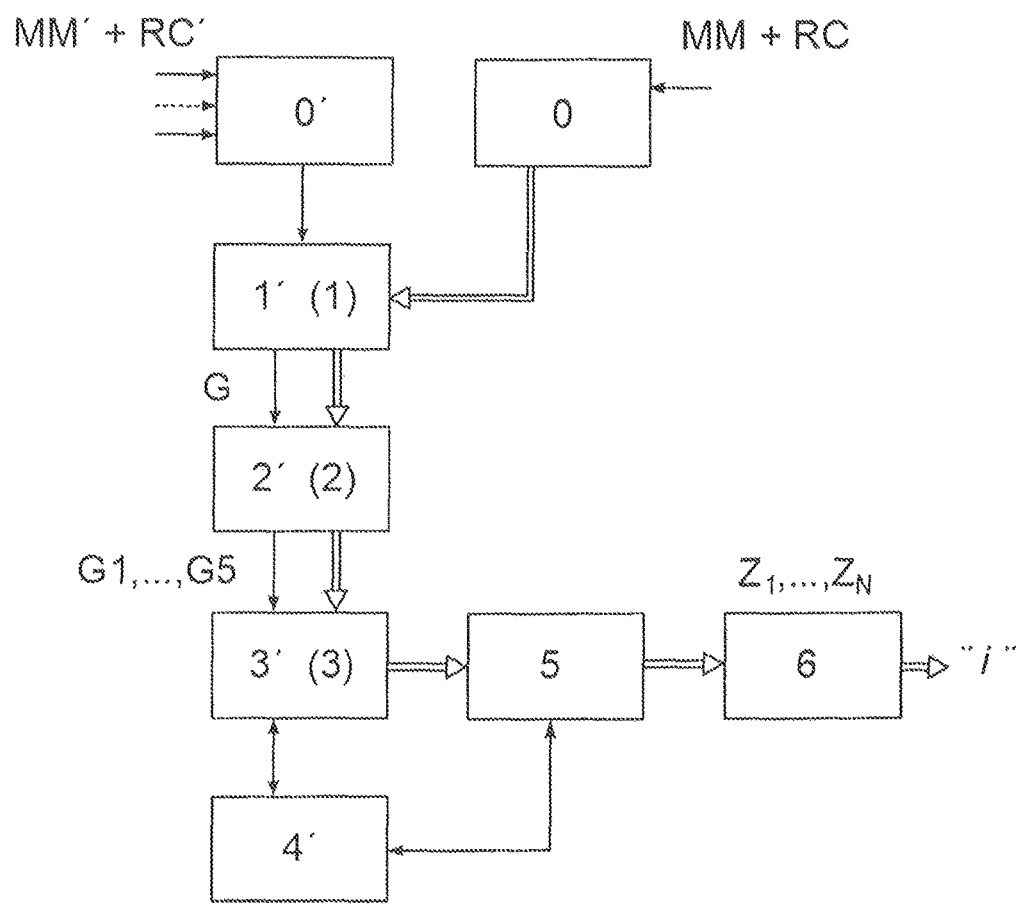

A method according to the present invention is explained in an embodiment shown in the drawing, where FIG. 1 presents a drive train with unknown condition connected to a computing device having a processor with means for implementing the method according to the invention, FIG. 2 presents N different drive trains connected to the computing device, where the condition of each drive train is known and used for training purposes, FIG. 3—is a diagram showing examples of the operations conducted in a signal processing unit of the computing device, FIG. 4—is diagram showing schematically some examples of features obtained in a feature extraction unit of the computing device, FIG. 5—presents an example of a neural network structure contained in the training and classification unit of the computing device, where the structure is suitable for assessing N conditions by analyzing K+M+R input signals, FIG. 6—shows a flow chart of the example of assessing the condition of the rotating component connected to an electric motor according to the present invention.

In the example system, consisting of a drive train under investigation, is presented in FIG. 1, which is comprised of an electrical motor MM, powered from three phase electrical source and a rotating machine RM connected to the motor. In the example embodiment the rotating machine is a gearbox. The electric motor MM is connected to a computing device CD having six units 3.1-3.6 suitable for implementation of the method according to the invention. The computing device CD comprises:

a data acquisition unit 3.1 for acquiring electric currents ($I_A$, $I_B$, $I_C$) and voltages ($U_A$, $U_B$, $U_C$) signals from the electric motor MM, a signal processing unit 3.2 for processing the acquired signals into different groups of signals, a feature extracting unit 3.3 for extraction of features from the processed signals into different groups of features, a training and classification unit 3.4 for training a neural network with data from N different drive trains for classifying the condition of the known N drive trains, said training and classification unit 3.4 is equipped with a classifier system 3.4.1, a data storage unit 3.5 for storing data obtained from N different drive trains, presented in FIG. 2 and recorded during the training of the neural network, presented in FIG. 5, a user notification unit 3.6 for checking the health condition of the train drive under investigation and for displaying the result of the investigation.

The same computing device CD (CD') may be used for performing the training of the neural network presented, as presented in FIG. 2. This computing device CD (CD') is equipped with the units 3.1-3.6 for training the neural network with the data from the N different drive trains connected to it, where the condition of each drive train is known and indicated as Condition 1, Condition 2, . . . Condition N.

In the example system a set of N drive trains are presented in FIG. 2 wherein each drive train consists of an electric motor MM' and a rotating machine RM' which is also a gearbox (N≥2). Each of the N drive trains is comprised of electric motors and rotating machines of the same type and model, the condition of the electric motors is considered to be healthy and each of the rotating machines has a known condition, where at least one rotating machine condition corresponds to a healthy and the rest of the rotating machines conditions correspond to faulty, which are indicated as Condition 1, Condition 2, Condition N. Each of the motors MM' is connected to a computing device CD or CD' having six units 3.1-3.6 suitable for using a neural network in order to Implement the method according to the invention. The computing device CD or CD' is equipped with the processor with all above mentioned units, standard memories RAM, ROM and other typical hardware that are not presented in the drawing. The computing device may be a typical computer or PC with the peripheral devices connected to it for displaying or printing the result of assessment. The result of the assessment will trigger another action for a safety maintaining the continuity of investigated drive train, that are not presented in the drawing.

The method according to the invention is realized in the following steps:

Step 0. Preliminaries.

Preparing a drive train (FIG. 1) for investigation whose unknown condition needs to be assessed. Said drive train has a motor MM and a rotating machine RM (for example a gearbox). The rotating component RC is working under unknown conditions. Instead of the gearbox, compressor, a pump, a fan or any other type of rotating machinery may be connected to the electric motor.

Step 0'. Preliminaries.

Preparing N preliminary drive trains (N≥2) (FIG. 2), wherein each drive train is comprised of a motor MM' of the same type and model of the motor MM and a rotating machine, RM', of the same type and model of the rotating machine RM. All of the drive train conditions are different and known a priori. The known condition of the drive train having the Motor MM'1 is named as Condition 1, the known condition of the drive train with the motor MM'2 is named as Condition 2 and so on up to the drive train with the MM'N motor and with Condition N. At least one of the N drive trains has healthy condition.

Step 1'. Data Acquisition.

Conduct data acquisition of electrical signals of currents ($I_{A1}$, $I_{A2}$ . . . , $I_{AN}$, $I_{B1}$, $I_{B2}$ . . . $I_{BN}$; $I_{C1}$, $I_{C2}$ . . . $I_{CN}$) and of voltages ($U_{A1}$, $U_{A2}$ . . . $U_{AN}$; $U_{B1}$, $U_{B2}$ . . . $U_{BN}$; $U_{C1}$, $U_{C2}$ . . . $U_{CN}$) from the motors of the N different drive trains. This data acquisition is conducted in data acquisition campaigns in which a representative amount of data is acquired, wherein the amount of data is determined by the sampling frequency of the data acquisition unit 3.1 of a computing device CD or CD', and the duration in seconds of each data acquisition campaign. The data acquired in each data acquisition campaign represents one data set. The total amount of data sets is G (where G is a natural number). At least 10 data sets (G=10) are required to conduct the next steps concerning the classifier training phase of the neural network. After G acquisition campaigns a total amount G of data sets is available in the data acquisition unit 3.1 of the computing device CD or CD'.

Step 2'. Signal Processing.

Once the electrical signals have been acquired, their time waveforms are processed in the signal processing unit 3.2 in the following three ways:

a) by applying a Notch filter to the currents ($I_{A1}$, $I_{A2}$ . . . $I_{AN}$) and voltages ($U_{A1}$, $U_{A2}$ . . . $U_{AN}$) signals in order to remove the fundamental frequency component and obtaining the filtered currents waveforms $W_C$ and filtered voltages waveforms $W_V$, b) by applying the Fourier transform to the filtered currents $W_C$ and filtered voltages $W_V$ waveforms in order to obtain the frequency spectra of the currents $S_C$ and the frequency spectra of the voltages $S_V$, c) by applying Time Synchronous Averaging method to the filtered currents signals ($W_{C1}, W_{C2}, \ldots, W_{CN}$) in order to obtain a time waveform $TSA_C$ that represents the behavior of the filtered currents during one rotation of the electric motor shaft.

The result of the step 2' should be five total groups G1-G5 of data sets, and each group G1-G5 has data sets 1, 2 . . . N of the following signals:

G1-$W_{C1}, \ldots, W_{CN}$: time waveforms of the filtered currents of the drive train with Condition 1, Condition 2, . . . , Condition N,

G2-$W_{V1}, \ldots, W_{VN}$: time waveforms of the filtered voltages of the drive train with condition 1, Condition 2, . . . , Condition N,

G3-$S_{C1}, \ldots, S_{CN}$: frequency spectra of the filtered currents of the drive train with condition 1, Condition 2, . . . , Condition N,

G4-$S_{V1}, \ldots, S_{VN}$: frequency spectra of the filtered voltages of the drive train with Condition 1, Condition 2, . . . , Condition N,

G5-$TSA_{C1}, \ldots, TSA_{CN}$: Time Synchronous Averaged waveforms of the filtered currents of the drive train with Condition 1, Condition 2, . . . , Condition N.

Step 3'. Extraction of Representative Features.

According to the different groups G1-G5 of signals, different features may be extracted from their data sets 1, 2 . . . N, this is performed in the feature extraction unit 3.3 of the computing device CD or CD'.

For groups G1 and G2 typical statistical features are calculated, preferably as: mean value, standard deviation, skewness, kurtosis, signal entropy, peak to peak value, maximum peak value, root mean square (RMS), crest factor and shape factor. The total number of features to be extracted from the time waveforms will be K. These indicators are preferable and not limited to the ones listed previously, other indicators may be also used.

For groups G3 and G4 extracted features are comprised of general features associated with the spectrum itself and the amplitude values of frequency components related with the rotating machine components (blades/vanes in pumps and compressors, gears in gearboxes). The features extracted from the frequency spectrum signal include, but are not limited to: frequency center, frequency at which the maximum peak is present, amplitude of the frequency peak corresponding to the first harmonic of the Gear Mesh Frequency (1×GMF), amplitude of the frequency peak corresponding to the second harmonic of the gear mesh frequency (2×GMF), amplitude of the frequency peak of the Blade Pass Frequency (1×BPF), amplitude of the frequency peak at the second harmonic of the Blade Pass Frequency (2×BPF). The total number of features to be extracted from the frequency spectra will be M.

For group G5 similar features to the ones extracted from the waveforms as in group G1 and G2 can be calculated. These features include, but are not limited to: kurtosis, skewness, maximum peak value, crest factor and signal entropy. The total number of features to be extracted from the Time Synchronous Averaged signal will be R.

In total, there are K+M+R features extracted from each data sets 1 . . . N of the G1-G5 groups and these features are used to train the neural network in the classifier system 3.4.1 which is implemented in the training and classification unit 3.4 of the computing device CD or CD'.

Step 4'. Training of Classifier System.

The classifier system 3.41 is built using neural networks. The neural network is trained by inputting the features extracted previously in the step 3' The training is conducted by using typical neural network training algorithms. These training algorithms include, but are not limited to: conjugate gradient methods, the Levenberg-Marquardt algorithm or gradient descent methods.

From the total G1-G5 data sets 1, 2 . . . N, 70% are used for training and 30% are used for testing.

After the Classifier system 3.4.1 is trained, with the 70% of the training data set, additional checks are carried out to test the performance of the classifier system 3.4.1. Table 1 illustrates the structure of a confusion matrix for a classifier system trained to classify between two different drive train conditions (Condition 1 and Condition 2).

TABLE 1

|  |  | Actual Condition | |
|---|---|---|---|
|  |  | 1 | 2 |
| Predicted Condition | 1 | True Positive | False Positive |
|  | 2 | False Negative | True Negative |

The Actual Condition, represents the real condition of the system under analysis and the Predicted Condition represents the condition predicted by the classifier system. The true positives represent the data sets whose actual condition is 1 and whose predicted condition is 1. The False positives represent the data sets whose actual condition is 2 and whose predicted condition is 1. The False negatives represent the data sets whose actual condition is 1 and whose predicted condition is 2 and finally the True Negatives represent the data sets whose actual condition is 2 and whose predicted condition is 2.

The elements of the confusion matrix: True Positives, False Positives, False Negatives and True Negatives are used to evaluate the following factors: Precision, Recall and F score of the classifier. The value of the Precision, Recall and F score will determine if the Classifier system 3.4.1 requires more training or if it is already properly trained to be used with drive train with unknown condition.

The Precision (P) is defined as:

$$P = \frac{\text{True Positives}}{\text{True Positives} + \text{False Positives}}$$

The Recall (R) is defined as $$R = \frac{\text{True Positives}}{\text{True Positives} + \text{False Negatives}}$$

The F Score is define as:

$$F = 2\frac{PR}{P+R}$$

After training the Classifier system 3.4.1, the F score is calculated for the training data set and for the test data set. If both F scores are above 0.95, the Classifier system is considered to be properly trained, if not, then more data will be acquired and the classifier system will be re-trained until the F score of both data sets (training and testing) is above 0.95.

Step 1. Data Acquisition

Repeating the step 1' using an on-line data acquisition unit 3.1 to acquire current ($I_A$, $I_B I_C$) and voltage signals ($U_A$, $U_B$, $U_C$) from the motor (MM) of the drive train with unknown condition. In the FIG. 6 this step is indicated in parentheses.

Step 2. Signal Processing.

Repeating the step 2' for the drive train with unknown condition by filtering the measured signals to remove the fundamental frequency components and processing the filtered signals to generate: time waveforms of the currents $W_{CX}$ and voltages $W_{VX}$, frequency spectra of the currents $S_{CX}$ and voltages $S_{VX}$, Time Synchronous Averaged $TSA_{CX}$ waveforms of the currents by using a Signal processing unit (3.2), for the drive train with unknown condition. In the FIG. 6 this step is indicated in parentheses.

Step 3. Extraction of Representative Features

Repeating the step 3' for the drive train under investigation by extracting representative features of time waveforms, of the currents (G1-$W_{CX}$) and voltages (G2-$W_{VX}$), representative features of the frequency spectra of the currents (G3-$S_{CX}$) and voltages (G4-$S_{VX}$), and representative features of Time Synchronous Averaged (TSA) waveforms of the currents (G5-$TSA_{CX}$), by using Feature extraction unit 3, for the drive train under investigation. In the FIG. 6 this step is indicated in parentheses.

Step 5. Data Set Classification Process.

Once the Classifier system 3.4.1 has been trained it can be, used to classify drive trains with unknown condition (FIG. 1); given that this unknown condition is at least one of the N conditions used to train the Classifier system 3.4.1. To start with the classification process of a drive train of unknown condition it is required to acquire the electric signals from the motor MM, and next repeat the steps 1', 2' and 3' for receiving a real data of the drive train of unknown condition. These actions are indicated in the flowchart (FIG. 6) as (1), (2), (3). Once the features are extracted they are used as inputs for the Classifier system 3.4.1, which will provide an output. This output is a vector with $Z=[Z_1 \ldots Z_N]$, elements. From this vector Z, N−1 elements should be equal to 0 and one element should be 1.

Step 6. Condition Identification.

The output vector Z of the Classifier system 3.4.1 is comprised of N−1 elements that are 0 and one element that is 1, The index i of said element equal to 1 determines the identified condition of the drive train analyzed.

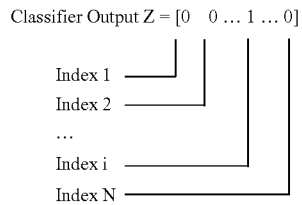

In the case that the N elements of the output vector of the classifier system are 0, the user is notified that the condition of the analyzed drive train component could not be assessed.

All steps presented above are implemented in a computer program product comprising non-transitory computer-readable program code which when executed on a computing device CD or CD' carries out the steps of assessing the condition of rotating machinery RC (RC') connected to an electric motor MM comprising a drive train, and the computing device CD or CD' is provided with functional units (3.1-3.6) suitable for using a known neural network algorithm.

The invention claimed is:

1. A method for operating a first drive train including a rotating machine (RM) connected to an electric motor (MM) using a computing device operatively coupled to the first drive train and including a signal processing unit and a non-transitory computer readable medium, the method comprising:

building N (N≥2) drive trains, having (MM') motors and (RM') rotating machines, the motors (MM') and the rotating machines (RM') each being of the same type and model, wherein drive train component health conditions are known as Condition 1 to Condition N, for training a neural network, and wherein the type and the model of the motors (MM') and the rotating machines (RM') match the type and model of the motor and rotating machine of the first drive train, using a data acquisition unit of the computing device to acquire current ($I_1, \ldots, I_N$) and voltage signals ($U_1, \ldots, U_N$) of the motors (MM') of the N different drive trains with Conditions 1 to Condition N, the acquired current and voltage signals being received from a set of non-electromechanical sensors that are not mounted to the N different drive trains, filtering the measured signals, with the computing device, to remove the fundamental frequency components and processing the filtered signals to generate: time waveforms of the currents (Wc) and voltages (Wv), frequency spectra of the currents (Sc) and voltages (Sv) and time synchronous averaged (TSAc) waveforms of the currents by using the signal processing unit, and in a feature extraction unit of the computing device, extracting representative features of time waveforms of the current (G1-$Wc_{1\ldots N}$), and voltages (G2-$Wv_{1\ldots N}$), representative features of the frequency spectra of the currents (G3-$Sc_{1\ldots N}$) and voltages (G4-$S_{V\ldots 1}$), and representative features of time synchronous averaged (TSA) waveforms of the currents (G5-$TSA_{c1\ldots N}$), training a neural network with the computing device, using a first portion of the representative features obtained with the extraction unit and storing the information of the trained neural network in the non-transitory computer readable medium of the computing device (CD) or (CD'), using an on-line data acquisition unit of the computing device to acquire current ($I_A$, $I_B$, $I_C$) and voltage signals ($U_A$, $U_B$, $U_C$) of the motor (MM) of the first drive train, for the first drive train, filtering the measured signals to remove the fundamental frequency components and processing the filtered signals to generate: time waveforms of the currents (Wcx) and voltages (Wvx), frequency spectra of the currents (Scx) and voltages (Svx), time synchronous averaged (TSA) waveforms of the currents (TSAcx) by using the signal processing unit of the computing device, for the first drive train, extracting the representative features of time waveforms of the currents (G1-Wcx) and voltages (G2-Wvx), the representative features of the frequency spectra of the currents (G3-Scx) and voltages (G4-Svx), and the representative features of time synchronous averaged (TSA) waveforms of the currents (G5-TSAcx), by using the feature extraction unit of the computing device, classifying, with the computing device, the drive train component health condition of rotating machine (RM) connected to the electric motor (MM) of the first drive train by analyzing all the extracted representative features obtained from the signals acquired from the first drive train by using the trained neural network, generating an output vector ($Z=[Z_1 \ldots Z_N]$), wherein the vector (Z) has N elements and if the output vector Z has only one element having value equal to 1 and the remaining rest of element values are equal to 0, determining the index (i) of the element with the value equal to 1, which index (i) indicates that the drive train component health condition of the first drive train is equal to the $i^{th}$ Condition of the N available known drive train component health conditions, and altering the operation of the first drive train in response to classifying the drive train component health condition of the rotating machinery (RM) connected to the electric motor (MM) of the first drive train by using a value of the output vector ($Z=[Z_1 \ldots Z_N]$) effective to maintain the continuity of the first drive train.

2. A method according to claim 1, wherein the steps of extracting the representative features from the time waveforms of filtered currents (Wc) and filtered voltage (Wv), which are performed in the signal processing unit, one of the following values: mean value, standard deviation, skewness, kurtosis, signal entropy, peak to peak value, maximum peak value, root mean square (RMS), crest factor and shape factor or their combinations, are chosen for next proceedings.

3. A method according to claim 1, wherein in the step of extracting the representative features from the frequency spectra of filtered currents (Sc) and filtered voltage (Sv), which are performed in the signal processing unit, one of the following values: frequency center, frequency at which the maximum peak is present, amplitude of the frequency peak corresponding to the first harmonic of the gear mesh frequency (1×GMF), amplitude of the frequency peak corresponding to the second harmonic of the gear mesh frequency (2×GMF), amplitude of the frequency peak of the blade pass frequency (1×BPF), amplitude of the frequency peak of the second harmonic of the blade pass frequency (2×BPF), are chosen for next proceedings.

4. A method according to claim 1, wherein the step of extracting the representative features from the time synchronous averaged waveforms of the currents, which are performed in the signal processing unit, one of the following values: kurtosis, skewness and signal entropy, are chosen for next proceedings.

5. A computing device structured to operate a first drive train having an unknown condition including a rotating machinery (RM) and an electrical motor (MM), the computing device comprising:

a non-transitory computer-readable medium structured to store instructions which when executed on the computing device performs the following steps:

building N (N≥2) drive trains, having (MM') motors and (RM') rotating machines, the motors and the rotating machines being of the same type and model, wherein drive train component health conditions are known as Condition 1 to Condition N, for training a neural network, and wherein the type and the model of the motors (MM') and the rotating machines (RM') match the type and model of the motor and rotating machine of the first drive train, using a data acquisition unit of the computing device to acquire current ($I_1, \ldots, I_N$) and voltage signals ($U_1, \ldots, U_N$) of the motors (MM') of the N different drive trains with Conditions 1 to Condition N, the acquired current and voltage signals being received from a set of non-electromechanical sensors that are not mounted to the N different drive trains, filtering the measured signals to remove the fundamental frequency components and processing the filtered signals to generates time waveforms of the currents (Wc) and voltages (Wv), frequency spectra of the currents (Sc) and voltages (Sv) and Time Synchronous Averaged (TSAc) waveforms of the currents by using a signal processing unit of the computing device, and in a feature extraction unit of the computing device, extracting representative features of time waveforms of the currents ($G1\text{-}Wc_{1 \ldots N}$) and voltages ($G2\text{-}Wv_{1 \ldots N}$), representative features of the frequency spectra of the currents ($G3\text{-}S_{c1 \ldots N}$) and voltages ($G4\text{-}S_{V \ldots 1}$), and representative features of Time Synchronous Averaged (TSA) waveforms of the currents ($G5\text{-}TSA_{c1 \ldots N}$), training a neural network using a first portion of the representative features and storing the information of the trained neural network in the non-transitory computer readable medium, and repeating using a data acquisition unit using an on-line data acquisition unit to acquire current ($I_A, I_B, I_C$) and voltage signals ($U_A, U_B, U_C$) of the motor (MM) of the first drive train, filtering the measured signals for the first drive train by filtering the measured signals to remove the fundamental frequency components and processing the filtered signals to generate: time waveforms of the currents (Wcx) and voltages (Wvx), frequency spectra of the currents (Scx) and voltages (Svx), time synchronous averaged (TSA) waveforms of the currents (TSAcx) by using a signal processing unit of the computing device, for the first drive train, extracting representative features of time waveforms of the currents and voltages for the drive train with unknown condition by extracting the representative features of time waveforms of the currents (G1-Wcx) and voltages (G2-Wvx), the representative features of the frequency spectra of the currents (G3-Scx) and voltages (G4-Svx), and the representative features of time synchronous averaged (TSA) waveforms of the currents (G5-TSAcx), by using the feature extraction unit for the first drive train, classifying the drive train component health condition of the rotating machine (RM) connected to the electric motor (MM) of the first drive train by analyzing in the computing device all the extracted representative features obtained from the signals acquired from the first drive train by using the trained neural network, generating an output vector ($Z=[Z_1 \ldots Z_N]$), wherein the vector (Z) has N elements and if the output vector (Z) has only one element having value equal to 1 and the remaining element values are equal to 0, determining the index (i) of the element with the value equal to 1, which index (i) indicates that the drive train component health condition of the first drive train is equal to the $i^{th}$ Condition of the N available known drive train component health conditions, and altering the operation of the first drive train in response to classifying the drive train component health condition of the rotating machinery (RM) connected to the electric motor (MM) of the first drive train by using a value of the output vector ($Z=[Z_1 \ldots Z_N]$) effective to maintain the continuity of the first drive train.

6. A computing device according to claim 5, wherein the steps of extracting representative features from the time waveforms of filtered currents (Wc) and filtered voltage (Wv), which are performing in the signal processing unit, one of the following values: mean value, standard deviation, skewness, kurtosis, signal entropy, peak to peak value, maximum peak value, root mean square (RMS), crest factor and shape factor, are chosen for next proceedings.

7. A computing device according to claim 5, wherein the step of extracting representative features from the frequency spectra of filtered currents (Sc) and filtered voltage (Sv), which are performing in the signal processing unit, one of the following values: frequency center, frequency at which the maximum peak is present, amplitude of the frequency peak corresponding to the first harmonic of the gear mesh frequency (1×GMF), amplitude of the frequency peak corresponding to the second harmonic of the gear mesh frequency (2×GMF), amplitude of the frequency peak of the blade pass frequency (1×BPF), amplitude of the frequency peak at the second harmonic of the blade pass frequency (2×BPF), are chosen for next proceedings.

8. A computing device according to claim 5, wherein the step of extracting representative features from the time synchronous averaged waveforms of the currents, which are performing in the signal processing unit, one of the following values: kurtosis, skewness and signal entropy, are chosen for next proceedings.

9. A monitored drive train comprising:
an electrical motor (MM) connected with a rotating machine (RM); and
a computing device including a signal processing unit and a non-transitory computer readable medium, the computing device being structured to execute instructions stored on the non-transitory computer readable medium using the signal processing unit so as to perform the following steps:
building N (N≥2) drive trains, having (MM') motors and (RM') rotating machines, the motors and the rotating machines being of the same type and model, wherein drive train component health conditions are known as Condition 1 to Condition N, for training a neural network, and wherein the type and the model of each of the motors (MM') and the rotating machines (RM') match the type and model of the motor (MM) and rotating machine (RM) of the monitored drive train,
using a data acquisition unit of the computing device to acquire current ($I_1, \ldots, I_N$) and voltage signals ($U_1, \ldots, U_N$) of the motors (MM') of the N different drive trains with Conditions 1 to Condition N, the acquired current and voltage signals being received from a set of non-electromechanical sensors that are not mounted to the N different drive trains,
filtering the measured signals, with the computing device, to remove the fundamental frequency components and processing the filtered signals to generate: time waveforms of the currents (Wc) and voltages (Wv), frequency spectra of the currents (Sc) and voltages (Sv) and time synchronous averaged (TSAc) waveforms of the currents, and in a feature extraction unit of the computing device, extracting representative features of time waveforms of the current (G1-Wc$_{1 \ldots N}$), and voltages (G2-Wv$_{1 \ldots N}$), representative features of the frequency spectra of the currents (G3-Sc$_{1 \ldots N}$) and voltages (G4-S$_{V \ldots 1}$), and representative features of time synchronous averaged (TSA) waveforms of the currents (G5-TSA$_{c1 \ldots N}$),
training a neural network with the computing device, using a first portion of the representative features obtained with the extraction unit and storing the information of the trained neural network in the non-transitory computer readable medium,
using an on-line data acquisition unit of the computing device to acquire current ($I_A, I_B, I_C$) and voltage signals ($U_A, U_B, U_C$) of the motor (MM) of the monitored drive train,
for the monitored drive train, filtering the measured signals to remove the fundamental frequency components and processing the filtered signals to generate: time waveforms of the currents (Wcx) and voltages (Wvx), frequency spectra of the currents (Scx) and voltages (Svx), time synchronous averaged (TSA) waveforms of the currents (TSAcx),
for the monitored drive train, extracting representative features of time waveforms of the currents (G1-Wcx) and voltages (G2-Wvx), representative features of the frequency spectra of the currents (G3-Scx) and voltages (G4-Svx), and representative features of time synchronous averaged (TSA) waveforms of the currents (G5-TSAcx), by using the feature extraction unit of the computing device,
classifying, with the computing device, the drive train component health condition of the rotating machine (RM) connected to an electric motor (MM) of the monitored drive train by analyzing all the extracted representative features obtained from the signals acquired from the monitored drive train by using the trained neural network,
generating an output vector ($Z=[Z_1 \ldots Z_N]$), wherein the vector (Z) has N elements and if the output vector Z has only one element having value equal to 1 and the rest of elements values are equal to 0, determining the index (i) of the element with the value equal to 1, which index (i) indicates that the drive train component health condition of the monitored drive train is equal to the $i^{th}$ condition of the N available known drive train component health conditions, and altering the operation of the monitored drive train in response to classifying the drive train component health condition of the rotating machinery (RM) connected to the electric motor (MM) of the monitored drive train by using a value of the output vector ($Z=[Z_1 \ldots Z_N]$) effective to maintain the continuity of the monitored drive train.

10. The monitored drive train according to claim 9, wherein the rotating machine is one of the following devices: gearbox, compressor, fan or pump.

11. The monitored drive train according to claim 9, wherein the steps of extracting representative features from the time waveforms of filtered currents (Wc) and filtered voltage (Wv), which are performed in the signal processing unit, one of the following vales: mean value, standard deviation, skewness, kurtosis, signal entropy, peak to peak value, maximum peak value, root mean square (RMS), crest factor and shape factor or their combinations, are chosen for next proceedings.

12. The monitored drive train according to claim 9, wherein in the step of extracting representative features from the frequency spectra of filtered currents (Sc) and filtered voltage (Sv), which are performed in the signal processing unit, one of the following values: frequency center, frequency at which the maximum peak is present, amplitude of the frequency peak corresponding to the first harmonic of the gear mesh frequency (1×GMF), amplitude of the frequency peak corresponding to the second harmonic of the gear mesh frequency (2×GMF), amplitude of the frequency peak of the blade pass frequency (1×BPF), amplitude of the frequency peak of the second harmonic of the blade pass frequency (2×BPF), are chosen for next proceedings.

13. The monitored drive train according to claim 9, wherein the step of extracting representative features from the time synchronous averaged waveforms of the currents, which are performed in the signal processing unit, one of the following values: kurtosis, skewness and signal entropy, are chosen for next proceedings.

\* \* \* \* \*